(12) United States Patent
Denis (10) Patent No.: US 11,198,190 B2
(45) Date of Patent: Dec. 14, 2021

(54) SYSTEMS AND METHODS FOR DUPLEX COMMUNICATIONS OVER A WELDING CABLE

(71) Applicant: ILLINOIS TOOL WORKS INC., Glenview, IL (US)

(72) Inventor: Marc Lee Denis, Lena, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 14/575,774

(22) Filed: Dec. 18, 2014

(65) Prior Publication Data

US 2016/0175970 A1 Jun. 23, 2016

(51) Int. Cl.
| | | |
|---|---|---|
| *B23K 9/10* | (2006.01) | |
| *B23K 9/173* | (2006.01) | |
| *B23K 9/167* | (2006.01) | |
| *B23K 9/12* | (2006.01) | |
| *H04L 5/14* | (2006.01) | |

(52) U.S. Cl.
CPC .......... *B23K 9/1062* (2013.01); *B23K 9/1087* (2013.01); *B23K 9/124* (2013.01); *B23K 9/167* (2013.01); *B23K 9/173* (2013.01); *H04L 5/14* (2013.01)

(58) Field of Classification Search
CPC .... B23K 9/1062; B23K 9/1087; B23K 9/124; B23K 9/167; B23K 9/173; H04L 5/14
USPC ................ 219/130, 124; 434/134, 234, 260; 600/546, 485, 595
See application file for complete search history.

(56) References Cited

U.S. PATENT DOCUMENTS

| | | | |
|---|---|---|---|
| 2,043,331 A | 6/1936 | Notvest |
| 2,175,891 A | 10/1939 | Graham |
| 2,526,597 A | 10/1950 | Winslow |
| 2,617,913 A | 11/1952 | Oestreicher |
| 2,642,515 A | 6/1953 | Bagg |
| 3,496,328 A | 2/1970 | Moerke |
| 3,992,565 A | 11/1976 | Gatfield |
| 4,051,344 A | 9/1977 | Robbins |
| 4,079,231 A | 3/1978 | Toth |

(Continued)

FOREIGN PATENT DOCUMENTS

| | | |
|---|---|---|
| CN | 101238646 | 8/2008 |
| CN | 101516561 | 8/2009 |

(Continued)

OTHER PUBLICATIONS

Echelon, "PL 3120 / PL 3150 Power Line Smart Transceiver Data Book," Version 2, 005-0154-01C.

(Continued)

*Primary Examiner* — Tu B Hoang
*Assistant Examiner* — Vy T Nguyen
(74) *Attorney, Agent, or Firm* — McAndrews, Held & Malloy, Ltd.

(57) ABSTRACT

In one embodiment, a welding system having a welding power supply configured to provide welding power is provided. The welding system additionally includes a weld cable coupled to the welding power supply and configured to transmit the welding power. The welding system further includes a processor configured to transmit and to receive a plurality of tones to provide communications with a device external to the welding power supply via the weld cable.

13 Claims, 4 Drawing Sheets

(56) References Cited

U.S. PATENT DOCUMENTS

| | | | |
|---|---|---|---|
| 4,147,919 A | 4/1979 | Matasovic | |
| 4,216,367 A | 8/1980 | Risberg | |
| 4,216,368 A | 8/1980 | Delay | |
| 4,227,066 A | 10/1980 | Bulwidas | |
| 4,247,752 A | 1/1981 | Stringer | |
| 4,266,114 A | 5/1981 | Hansen | |
| 4,410,789 A | 10/1983 | Story | |
| 4,450,340 A | 5/1984 | Corrigall | |
| 4,467,174 A | 8/1984 | Gilliland | |
| 4,508,954 A | 4/1985 | Kroll | |
| 4,521,672 A | 6/1985 | Fronius | |
| 4,531,045 A | 7/1985 | Kemp | |
| 4,561,059 A | 12/1985 | Davis | |
| 4,584,685 A | 4/1986 | Gajjar | |
| 4,608,482 A | 8/1986 | Cox | |
| 4,620,082 A * | 10/1986 | Graville | B23K 9/091 219/130.31 |
| 4,641,292 A | 2/1987 | Tunnell | |
| 4,767,908 A | 8/1988 | Dallavalle | |
| 4,769,754 A | 9/1988 | Reynolds | |
| 4,918,517 A | 4/1990 | Burgoon | |
| 4,973,821 A | 11/1990 | Martin | |
| 5,039,835 A | 8/1991 | Schwiete | |
| 5,043,557 A | 8/1991 | Tabata | |
| 5,063,282 A | 11/1991 | Gilliland | |
| 5,276,305 A | 1/1994 | Hsien | |
| 5,376,894 A | 12/1994 | Petranovich | |
| 5,406,050 A | 4/1995 | Macomber | |
| 5,653,902 A | 8/1997 | Chang | |
| 5,834,916 A | 11/1998 | Shimogama | |
| 5,982,253 A | 11/1999 | Perrin | |
| 6,040,555 A | 3/2000 | Tiller | |
| 6,091,048 A | 7/2000 | Lanouette | |
| 6,103,994 A | 8/2000 | Decoster | |
| 6,156,999 A | 12/2000 | Ignatchenko | |
| 6,166,506 A | 12/2000 | Pratt | |
| 6,225,596 B1 | 5/2001 | Chandler | |
| 6,423,936 B1 | 7/2002 | Reed | |
| 6,458,157 B1 | 10/2002 | Suaning | |
| 6,479,791 B1 | 11/2002 | Kowaleski | |
| 6,479,795 B1 | 11/2002 | Albrecht | |
| 6,570,132 B1 | 5/2003 | Brunner | |
| 6,624,388 B1 | 9/2003 | Blankenship | |
| 6,627,849 B2 | 9/2003 | Ihde | |
| 6,653,597 B2 | 11/2003 | Baum | |
| 6,710,927 B2 | 3/2004 | Richards | |
| 6,781,095 B2 | 8/2004 | Hayes | |
| 6,818,860 B1 | 11/2004 | Stava | |
| 6,906,285 B2 | 6/2005 | Zucker | |
| 6,909,285 B2 | 6/2005 | Jordan | |
| 7,205,503 B2 | 4/2007 | Reynolds | |
| 8,345,819 B2 | 1/2013 | Mastronardi | |
| 9,352,411 B2 * | 5/2016 | Batzler | B23K 9/32 |
| 9,511,443 B2 * | 12/2016 | Pfeifer | B23K 9/095 |
| 2001/0043656 A1 | 11/2001 | Koslar | |
| 2003/0089693 A1 | 5/2003 | Hayes | |
| 2004/0199846 A1 | 10/2004 | Matsumoto | |
| 2005/0087523 A1 | 4/2005 | Zucker | |
| 2005/0230372 A1 | 10/2005 | Ott | |
| 2006/0027546 A1 | 2/2006 | Reynolds | |
| 2006/0076335 A1 | 4/2006 | Reynolds | |
| 2006/0086706 A1 * | 4/2006 | Ulrich | B23K 9/1087 219/132 |
| 2006/0138113 A1 * | 6/2006 | Ott | B23K 9/1087 219/132 |
| 2007/0056942 A1 * | 3/2007 | Daniel | B23K 10/006 219/125.1 |
| 2007/0080154 A1 | 4/2007 | Ott | |
| 2007/0114216 A1 | 5/2007 | Ott | |
| 2007/0267395 A1 | 11/2007 | Broadwater | |
| 2011/0069766 A1 | 3/2011 | Takahashi | |
| 2011/0073569 A1 | 3/2011 | Rappl | |
| 2011/0134976 A1 | 6/2011 | Fossion | |
| 2011/0240620 A1 | 10/2011 | Ott | |
| 2011/0248009 A1 | 10/2011 | Long | |
| 2011/0309062 A1 * | 12/2011 | O'Donnell | B23K 9/1043 219/130.1 |
| 2012/0037354 A1 | 2/2012 | McCoy | |
| 2012/0076212 A1 | 3/2012 | Zeppetelle | |
| 2012/0097644 A1 | 4/2012 | Ott | |
| 2012/0099864 A1 | 4/2012 | Ishihara | |
| 2012/0128042 A1 | 5/2012 | Tzou | |
| 2012/0207057 A1 | 8/2012 | Karaoguz | |
| 2013/0288211 A1 * | 10/2013 | Patterson | G09B 5/00 434/234 |
| 2014/0001169 A1 | 1/2014 | Enyedy | |
| 2014/0076872 A1 | 3/2014 | Ott | |
| 2014/0263256 A1 | 9/2014 | Rappl | |
| 2014/0269873 A1 | 9/2014 | Tahir | |
| 2014/0269874 A1 | 9/2014 | Afkhami | |
| 2015/0196970 A1 | 7/2015 | Denis | |
| 2015/0258621 A1 | 9/2015 | Ulrich | |
| 2015/0375330 A1 | 12/2015 | Doi | |
| 2016/0158869 A1 * | 6/2016 | Trinnes | B23K 9/1043 219/132 |

FOREIGN PATENT DOCUMENTS

| | | |
|---|---|---|
| CN | 103180080 | 6/2013 |
| EP | 0575082 | 12/1993 |
| EP | 1586403 | 10/2005 |
| EP | 1748573 | 1/2007 |
| EP | 2020758 | 2/2009 |
| JP | S59193768 | 11/1984 |
| JP | 61137675 | 6/1986 |
| JP | 162966 | 6/1992 |
| JP | 4162964 | 6/1992 |
| JP | 04162964 | 6/1992 |
| JP | 04162966 | 6/1992 |
| JP | 05104248 | 2/1993 |
| JP | H1133729 | 2/1999 |
| JP | 2003088957 | 3/2003 |
| JP | 2003154455 | 5/2003 |
| JP | 2003191075 | 7/2003 |
| JP | 2003236663 | 8/2003 |
| WO | 2009149425 | 12/2009 |
| WO | 2010051104 | 5/2010 |
| WO | 2011041037 | 4/2011 |
| WO | 2012047444 | 4/2012 |
| WO | 2012058164 | 5/2012 |

OTHER PUBLICATIONS

Hackl et al., "Digitally Controlled GMA Power Sources," Fronius, www.fronius.com/worldwide/usa/products/paper_digitally_controlld_power_sources_gb.pdf, pp. 1-7, publication date not provided.

Intellon, "CEBus Power Line Encoding and Signaling," White Paper #0027, Mar. 1997, Version 0.1, pp. 1-6.

International Search Report from PCT application No. PCT/US2015/056128, dated Feb. 12, 2016, 13 pgs.

International Search Report from PCT application No. PCT/US2015/060762, dated Mar. 11, 2016, 13 pgs.

Neu, Thomas, "Impact of Sampling-Clock Spurs on ADC Performance," Texas Instruments Incorporated, 2009.

Communication Appln No. 15 804 258.0 issued by the European Patent Office dated Nov. 28, 2018.

* cited by examiner

SYSTEMS AND METHODS FOR DUPLEX COMMUNICATIONS OVER A WELDING CABLE

BACKGROUND

The present disclosure relates generally to welding systems and, more particularly, to systems and methods for duplex communications over a welding cable.

Welding is a process that has become increasingly prevalent in various industries and applications. Such processes may be automated in certain contexts, although a large number of applications continue to exist for manual welding applications. In both cases, such welding applications rely on a variety of types of equipment to ensure that the supply of welding consumables (e.g., wire, shielding gas, etc.) is provided to the weld in an appropriate amount at the desired time. For example, metal inert gas (MIG) welding typically relies on a wire feeder to enable a welding wire to reach a welding torch. The wire is continuously fed during welding to provide filler metal. A welding power source ensures that arc heating is available to melt the filler metal and the underlying base metal.

In certain applications, power cables supply power from the welding power source to a welding torch performing a welding application. For example, the welding power source may provide a welding voltage and current that may be utilized between the welding torch and a workpiece to perform the welding application. However, the arrangement and characteristics of power cables within the welding system may cause various distortions within the weld cable system that influence the welding process voltage and current. It may be beneficial to provide for systems and methods that more efficiently and accurately communicate over the weld cable.

BRIEF DESCRIPTION

Certain embodiments commensurate in scope with the originally claimed present disclosure are summarized below. These embodiments are not intended to limit the scope of the claimed present disclosure, but rather these embodiments are intended only to provide a brief summary of possible forms of the present disclosure. Indeed, the present disclosure may encompass a variety of forms that may be similar to or different from the embodiments set forth below.

In one embodiment, a welding system having a welding power supply configured to provide welding power is provided. The welding system additionally includes a weld cable coupled to the welding power supply and configured to transmit the welding power. The welding system further includes a processor configured to transmit and to receive a plurality of tones to provide communications with a device external to the welding power supply via the weld cable.

In another embodiment a method is provided. The method includes transmitting a plurality of tones through a weld cable from a transmitter disposed within a first welding cable communications (WCC) circuitry, and receiving at the plurality of tones through the weld cable at a receiver. The method also includes transmitting data to a communications device communicatively coupled to the receiver and disposed external to the welding power supply, wherein the plurality of tones is representative of the data.

In another embodiment a welding system includes a wire feeder system. The wire feeder system includes a transmitter configured to transmit a plurality of tones through a weld cable, and a receiver configured to receive the plurality of tones through the weld cable. The wire feeder system further includes a processor configured to derive the plurality of tones based on a data and to communicate the data via the weld cable, wherein the wire feeder system is configured to route welding power from the weld cable to a welding torch.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

The techniques described herein improve half and full duplex communications over a weld cable, such as a weld cable used in welding, cutting, grinding, induction heating, testing, and so on. In certain embodiments, the techniques described herein may additionally or alternatively be used to characterize the weld cable, and to adjust welding operations based on the characterization. That is, certain characteristics (e.g., impedance, cable length, conductor material type, wire gauge) of a specific cable may result in the power delivered from a welding power supply being slightly different than the power delivered to a workpiece after traversing the cable. In certain embodiments, weld cable communications (WCC) circuitry may provide for duplex (e.g., half duplex, full duplex) communications as well as for weld cable characterizations. For example, the WCC circuitry may apply certain tones described in more detail below to characterize the weld cable and/or to communicate data even while the weld cable is being used to deliver power. Accordingly, communications between a weld equipment operator and other parties may be improved, for example, in environments with poor over-the-air communications (e.g. radio, WiFi), such as inside a ship's hull, in a mine, inside a shaft, and the like.

Figure 1:
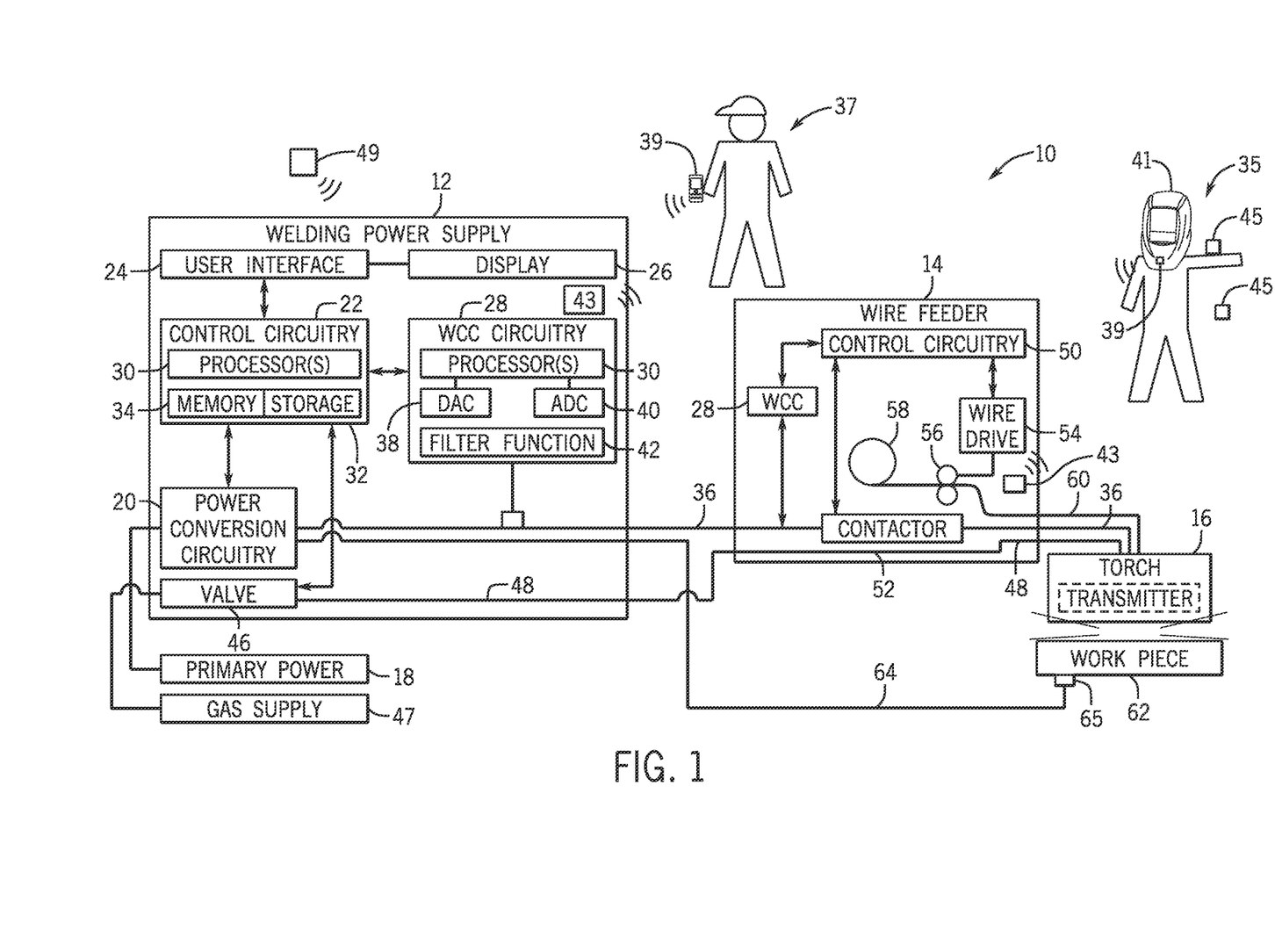
FIG. 1 is a block diagram of an embodiment of a welding system with a welding power supply having weld cable communications (WCC) circuitry for duplex communications, in accordance with aspects of the present disclosure.

Turning now to the drawings, FIG. 1 is a block diagram of an embodiment of a welding system 10 having a welding power supply 12, a wire feeder 14, and a welding torch 16. The welding system 10 powers, controls, and supplies consumables to a welding application. In certain embodiments, the welding power source 12 directly supplies input power to the welding torch 16. The welding torch 16 may be a torch configured for stick welding, tungsten inert gas (TIG)

welding, or gas metal arc welding (GMAW), based on the desired welding application. In the illustrated embodiment, the welding power source 12 is configured to supply power to the wire feeder 14, and the wire feeder 14 may be configured to route the input power to the welding torch 16. In addition to supplying an input power, the wire feeder 14 may supply a filler metal to a welding torch 14 for various welding applications (e.g., GMAW welding, flux core arc welding (FCAW)).

The welding power supply 12 receives primary power 18 (e.g., from the AC power grid, an engine/generator set, a battery, or other energy generating or storage devices, or a combination thereof), conditions the primary power, and provides an output power to one or more welding devices in accordance with demands of the system 10. The primary power 18 may be supplied from an offsite location (e.g., the primary power may originate from the power grid). Accordingly, the welding power supply 12 includes power conversion circuitry 20 that may include circuit elements such as transformers, rectifiers, switches, and so forth, capable of converting the AC input power to AC or DC output power as dictated by the demands of the system 10 (e.g., particular welding processes and regimes).

In some embodiments, the power conversion circuitry 20 may be configured to convert the primary power 18 to both weld and auxiliary power outputs. However, in other embodiments, the power conversion circuitry 20 may be adapted to convert primary power only to a weld power output, and a separate auxiliary converter may be provided to convert primary power to auxiliary power. Still further, in some embodiments, the welding power supply 12 may be adapted to receive a converted auxiliary power output directly from a wall outlet. Indeed, any suitable power conversion system or mechanism may be employed by the welding power supply 12 to generate and supply both weld and auxiliary power.

The welding power supply 12 includes control circuitry 22 to control the operation of the welding power supply 12. The welding power supply 12 also includes a user interface 24. The control circuitry 22 may receive input from the user interface 24 through which a user may choose a process and input desired parameters (e.g., voltages, currents, particular pulsed or non-pulsed welding regimes, and so forth). The user interface 24 may receive inputs using any input device, such as via a keypad, keyboard, buttons, touch screen, voice activation system, wireless device, etc. Furthermore, the control circuitry 22 may control operating parameters based on input by the user as well as based on other current operating parameters. Specifically, the user interface 24 may include a display 26 for presenting, showing, or indicating, information to an operator. The control circuitry 22 may also include interface circuitry for communicating data to other devices in the system 10, such as the wire feeder 14. For example, in some situations, the welding power supply 12 may wirelessly communicate with other welding devices within the welding system 10. Further, in some situations, the welding power supply 12 may communicate with other welding devices using a wired connection, such as by using a network interface controller (NIC) to communicate data via a network (e.g., ETHERNET, 10baseT, 10base100, etc.). In particular, the control circuitry 22 may communicate and interact with weld cable communications (WCC) circuitry 28, as further described in detail below.

The control circuitry 22 includes at least one controller or processor 30 that controls the operations of the welding power supply 12, and may be configured to receive and process multiple inputs regarding the performance and demands of the system 10. Furthermore, the processor 30 may include one or more microprocessors, such as one or more "general-purpose" microprocessors, one or more special-purpose microprocessors and/or ASICS, or some combination thereof. For example, in certain embodiments, the processor 30 may include one or more digital signal processors (DSPs).

The control circuitry 22 may include a storage device 32 and a memory device 34. The storage device 32 (e.g., nonvolatile storage) may include ROM, flash memory, a hard drive, or any other suitable optical, magnetic, or solid-state storage medium, or a combination thereof. The storage device 32 may store data (e.g., data corresponding to a welding application), instructions (e.g., software or firmware to perform welding processes), and any other suitable data. As may be appreciated, data that corresponds to a welding application may include an attitude (e.g., orientation) of a welding torch, a distance between the contact tip and a workpiece, a voltage, a current, welding device settings, and so forth.

The memory device 34 may include a volatile memory, such as random access memory (RAM), and/or a nonvolatile memory, such as read-only memory (ROM). The memory device 34 may store a variety of information and may be used for various purposes. For example, the memory device 34 may store processor-executable instructions (e.g., firmware or software) for the processor 30 to execute. In addition, a variety of control regimes for various welding processes, along with associated settings and parameters, may be stored in the storage device 32 and/or memory device 34, along with code configured to provide a specific output (e.g., initiate wire feed, enable gas flow, capture welding current data, detect short circuit parameters, determine amount of spatter) during operation.

In certain embodiments, the welding power flows from the power conversion circuitry 20 through a weld cable 36 to the wire feeder 14 and the welding torch 16. Furthermore, in certain embodiments, welding data may be provided with the weld cable 36 such that welding power and weld data are provided and transmitted together over the weld cable system. In particular, the WCC circuitry 28 may be communicatively coupled to the weld cable 36 to communicate (e.g., send/receive) data over the weld cable 36. The WCC circuitry 28 may be implemented based on various types of power line communications methods and techniques. For example, the WCC circuitry 28 may utilize IEEE standard P1901.2 to provide data communications over the weld cable 36. In this manner, the weld cable 36 may be utilized to provide welding power from the welding power supply 12 to the wire feeder 14 and the welding torch 16. Furthermore, the weld cable 36 may also be utilized to transmit (and/or receive) data communications to the wire feeder 14 and the welding torch 16. The WCC circuitry 28 may additionally be used to characterize weld cables, as described in more detail below. The WCC circuitry 28 may include embodiments described in more detail with respect to U.S. Pat. No. 8,592,724 entitled "REMOTE WIRE FEEDER USING BINARY PHASE SHIFT KEYING TO MODULATE COMMUNICATIONS OF COMMAND/CONTROL SIGNALS TO BE TRANSMITTED OVER A WELD CABLE," filed on Feb. 22, 2006 and issued on Nov. 26, 2013, which is hereby incorporated by reference in its entirety.

In certain embodiments, the WCC circuitry 28 includes one or more processors 30, a digital to analog converter 38 (e.g. DAC 38, which may function as a transmitter), an analog to digital converter 40 (e.g., ADC 40, which may function as a receiver), and a filter function 42 (e.g., filter circuitry, digital filter function circuitry, filter function software executable by the one or more processors 30, or any combination thereof). In particular, the WCC circuitry 28 may be utilized to determine channel equalization filter coefficients representative of a distortive characteristic and/or a distortion related to a weld cable. Specifically, the distortive characteristic may be a frequency and time dependent amplitude and phase distortion (e.g., amplitude and/or phase distortion that is both frequency dependent and time dependent), as further described with respect to FIGS. 2-3. Further, the WCC circuitry 28 may be configured to utilize the channel equalization filter coefficients to compensate for the distortive characteristic of the weld cable. In certain embodiments, the WCC circuitry 28 may include one or more processors 30 separate from the processors 30 of the control circuitry 22. In certain embodiments, the WCC circuitry 28 may utilize the processors 30 of the control circuitry 22. In certain embodiments, the WCC circuitry 28 may be incorporated within, or may be coupled to, the control circuitry 22. The WCC circuitry 28 may be utilized to determine weld cable characteristics and compensate for weld cable distortions, and to provide for duplex communications, as further described with respect to FIGS. 2-4.

The DAC 38 may be coupled to the processor 30, and is configured to transmit data communications utilizing one or more carrier channels or "tones." Specifically, the one or more tones may be described as complex sinusoidal signals that are transmitted by the DAC 38. In certain embodiments, the DAC 38 may be disposed within the welding power supply 12, and the tones may be transmitted to one or more components of the welding system 10, such as to the welding torch 16 and/or the wire feeder 14. In other embodiments, the DAC 38 may be disposed within the welding torch 16, and the tones may be transmitted to the welding power supply 12 and/or the wire feeder 14. Likewise, in other embodiments, one or more components of the WCC circuitry 28 (e.g., the DAC 38, the ADC 40, or the filter function 42) may be disposed anywhere within the welding system 10, such as within the wire feeder 14 and/or the welding torch 16.

In certain embodiments, the DAC 38 may transmit modulated tones and/or unmodulated tones. Modulated tones may be utilized to communicate (e.g., send/receive) data using one or more known techniques for modulating a signal for data transmission. For example, the DAC 38 may utilize a hybrid amplitude and phase modulation scheme, such as Bi-Phase Shift Keying (BPSK), Quadrature Phase Shift Keying (QPSK), 16-ary Quadrature Amplitude Shift Keying (16-QAM) or similar variations. The modulated tones transmitted may include any type of information useful for the welding process or operation. For example, in some situations, the data transmitted by the WCC circuitry 28 may include information related to any welding parameter (e.g., weld voltage, wire speed) that is transmitted to the wire feeder 14 and/or the welding torch 16 for welding applications.

In some embodiments, the DAC 38 may also transmit unmodulated tones (also known as "pilot tones") that do not carry data. Specifically, unmodulated tones may be sinusoidal signals that have predefined or known characteristics, such as a predefined amplitude, frequency and phase. For example, for a given process, the DAC 38 may transmit unmodulated tones having the same amplitude but a different frequency, which may be an integral multiple of a lower reference frequency and a phase offset value. In particular, in certain embodiments, modulated tones may be distinguishable from unmodulated tones based on their assigned frequency, or their position within an OFDM frame. For example, the positional assignment of modulated versus unmodulated tones may be pre-assigned and this position may be known at the receiver (e.g., the ADC 40). Since the characteristics of the unmodulated tones are also known, unmodulated tones may be utilized as reference tones. In certain embodiments, a set of modulated tones with known characteristics may also be transmitted. For example, modulated tones with a known data modulation scheme, and a known (or pre-defined) data sequence may be transmitted in lieu of and/or along with the known unmodulated tones.

Accordingly, the data sequence may be of the form of cyclic prefix within the OFDM frame, for example, such that the last N symbols of an OFDM frame are appended to the beginning of the frame. At the receiver (e.g., the ADC 40), a circular convolution of the received frame may be performed and the results of that convolution may be used to compute the equivalent frequency and time dependent amplitude and phase distortion in the weld cable 36, and from that information a set of coefficients for a correcting channel equalization filter (e.g., an inverse function of the measured distortion) may be determined. Accordingly, in certain embodiments, either a known modulated or a known unmodulated tone may be utilized as a reference. In certain embodiments, the DAC 38 may transmit a plurality of tones, any number of which may be modulated or unmodulated. For example, out of 64 tones transmitted by the DAC 38, 48 of the tones may be modulated tones utilized for data transmission and 16 tones may be unmodulated tones utilized as reference tones (without any data modulation). It should be noted that the DAC 38 may be configured to transmit any number of modulated tones and unmodulated tones.

In certain embodiments, an Orthogonal Frequency Division Multiplexing (OFDM) scheme may be utilized by the DAC 38 to transmit the modulated and unmodulated tones on multiple carrier frequencies (e.g., frequency-division multiplexing). For example, within the OFDM scheme, the DAC 38 may be configured to transmit the one or more tones over several parallel data stream or channels at a low modulation rate, thereby maintaining transmission characteristics that are similar to a single-carrier modulation scheme. In particular, the frequency-division multiplexing scheme may divide a single transmission medium having a particular total bandwidth into a series of non-overlapping frequency sub-bands that are each configured to carry a particular signal. In this manner, the single transmission medium (e.g., the weld cable 36) may be shared by multiple separate unmodulated or modulated tones.

Figure 2:
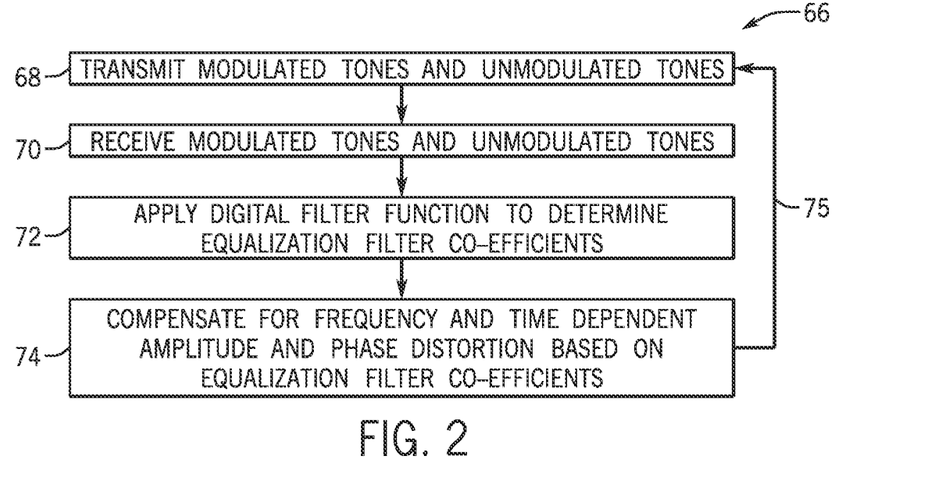
FIG. 2 is a flowchart of an embodiment of a process for compensating for weld cable distortions utilizing one or more weld cable distortion coefficients, in accordance with aspects of the present disclosure.
Figure 3:
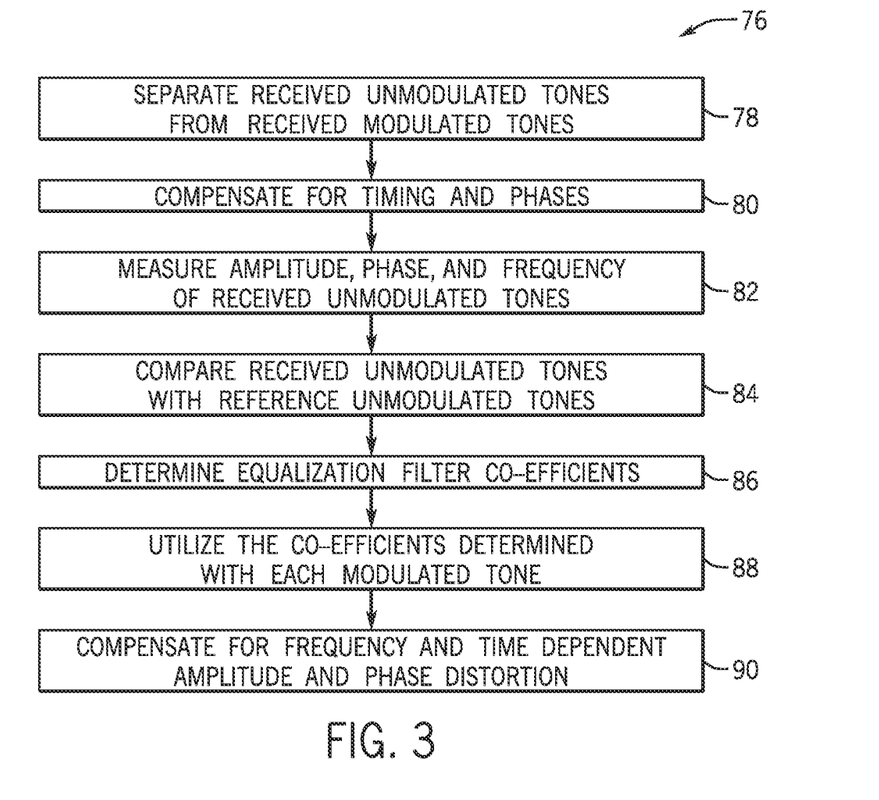
FIG. 3 is a flowchart of an embodiment of a process for calculating the one or more weld cable distortion coefficients of FIG. 2, in accordance with aspects of the present disclosure.

In certain embodiments, the ADC 40 of the WCC circuitry 28 may be configured to receive the several transmitted modulated and unmodulated tones, as described with respect to FIGS. 2-3. Further, the filter function 42 may be configured to process and analyze the received modulated and unmodulated tones to characterize the weld cable 36. More specifically, the filter function 42 of the WCC circuitry 28 may be configured to apply a digital filter function that is configured to compare the unmodulated tones transmitted by the DAC 38 with the unmodulated tones received by the ADC 40. In particular, based on the differences (if any) between the transmitted unmodulated signals and received unmodulated signals, the filter function 42 may be configured to determine one or more coefficients (e.g., values, polynomials, etc.). In certain embodiments, the one or more coefficients may correspond to distortion characteristics of the weld cable 36. Furthermore, the filter function 42 may be configured to utilize the determined coefficients to compensate for possible frequency and time dependent amplitude and phase distortion in the weld cable 36, as further described with respect to FIGS. 2-3. In certain embodiments, the WCC circuitry 28 is configured to communicate with the control circuitry 22, which may be configured to adjust a welding voltage provided to the welding torch 16 (and/or to the wire feeder 14) based on information received from the filter function 42.

Further, in certain embodiments, the storage device 32 or the memory device 34 may be configured to store data related to the WCC circuitry 28, such as characteristics (e.g., a phase, an amplitude, a frequency) of each unmodulated tone transmitted or received by the WCC circuitry 28, information related to the frequency of each tone transmitted or received by the WCC circuitry 28, the number and/or grouping of the unmodulated or modulated tones, the one or more determined frequency and time dependent amplitude and phase distortions in the weld cable 36, the location of the DAC 38 and/or the ADC 40, the channel equalization filter coefficients calculated or determined by the WCC circuitry 28, a current, previous, actual, or corrected welding operating parameter (e.g., welding voltage, wire speed), and any other information related to the WCC circuitry 28. In addition, in certain embodiments, the storage device 32 or the memory device 34 may be configured to store one or more templates of unmodulated (e.g., reference) or modulated tones that have known characteristics. For example, the one or more templates may include 16 unmodulated tones each having a known amplitude, a known frequency, and a known phase shift. When one or more unmodulated tones are received by the WCC circuitry 28, the WCC circuitry 28 may be configured to compare the received modulated or unmodulated tones with a corresponding template.

In certain embodiments, a communications system 43 may provide for external communications between the welding power supply 12 (and/or the WCC circuitry 28) and external systems. For example, the communications system 43 may provide for wired and/or wireless conduits to external systems (e.g., the welding operator communications system 39, external systems 49, and so forth). The wired conduits may include a serial peripheral interface (SPI) conduits, universal serial bus (USB) conduits, serial port conduits, two-wire conduits, and the like. The wireless conduits may include IEEE 802.11 conduits (e.g., WiFi), mesh network conduits, Bluetooth, WiMax, ZigBee, and the like. Accordingly, the communication system 43 may be connected to the control circuitry 22 and/or the WCC circuitry 28.

In certain embodiments, a gas supply 47 provides shielding gases, such as argon, helium, carbon dioxide, and so forth, depending upon the welding application. The shielding gas flows to a valve 46, which controls the flow of gas, and if desired, may be selected to allow for modulating or regulating the amount of gas supplied to a welding application. The valve 46 may be opened, closed, or otherwise operated by the control circuitry 22 to enable, inhibit, or control gas flow (e.g., shielding gas) through the valve 46. Shielding gas exits the valve 46 and flows through a cable 48 (which in some implementations may be packaged with the welding power output) to the wire feeder 14 which provides the shielding gas to the welding application. As may be appreciated, certain embodiments of the welding system 10 may not include the gas supply 44, the valve 46, and/or the cable 48.

In certain embodiments, the wire feeder 14 may use the welding power to power the various components in the wire feeder 14, such as to power control circuitry 50. As noted above, the weld cable 36 may be configured to provide or supply the welding power. The welding power supply 12 may also communicate with the wire feeder 14 using the cable 36 and the WCC circuitry 28 disposed within the welding power supply 12. In certain embodiments, the wire feeder 14 may include WCC circuitry 28, which is substantially similar to the WCC circuitry 28 of the welding power supply 12. Indeed, the WCC circuitry 28 of the wire feeder 14 may cooperate with the control circuitry 50 of the wire feeder 14 in similar ways as the welding power supply 12 cooperates with the control circuitry 22. The control circuitry 50 controls the operations of the wire feeder 14. In certain embodiments, the wire feeder 14 may use the control circuitry 50 to detect whether the wire feeder 14 is in communication with the welding power supply 12 and to detect a current welding process of the welding power supply 12 if the wire feeder 14 is in communication with the welding power supply 12.

A contactor 52 (e.g., high amperage relay) is controlled by the control circuitry 50 and configured to enable or inhibit welding power to continue to flow to the weld cable 36 for the welding application. In certain embodiments, the contactor 52 may be an electromechanical device, while in other embodiments the contactor 52 may be any other suitable device, such as a solid state device. The wire feeder 14 includes a wire drive 54 that receives control signals from the control circuit 50 to drive rollers 56 that rotate to pull wire off a spool 58 of wire. The wire is provided to the welding application through a wire cable 60. Likewise, the wire feeder 14 may provide the shielding gas through the cable 48. As may be appreciated, in certain embodiments, the cables 36, 48, and 60 may be bundled together or individually provided to the welding torch 16.

The welding torch 16 delivers the wire, welding power, and shielding gas for a welding application. The welding torch 16 is used to establish a welding arc between the welding torch 16 and a workpiece 62. In certain embodiments, the welding torch 16 may include the WCC circuitry 28, which is substantially similar to the WCC circuitry 28 of the welding power supply 12. Indeed, the WCC circuitry 28 of the welding torch 16 may interact in similar ways as the welding power supply 12 cooperates with the control circuitry 22. A work cable 64, which may be terminated with a clamp 65 (or another power connecting device), couples the welding power supply 12 to the workpiece 62 to complete a welding power circuit.

In the depicted embodiment, a second WCC circuitry 28 is disposed in the wire feeder 14 that facilitates communications, for example, between a welding operator 35 and an assistant operator 37. A first WCC circuitry 28 is disposed in the power supply 12. It should also be noted that the WCC circuitry 28 may be provided as a standalone device to be disposed on the weld cable 36. As a standalone device, the WCC circuitry 28 may include memory and processor(s) 30 suitable to execute computer instructions or code. As depicted, the assistant operator 37 may be located near the welding power supply 12 to assist with adjustments of the power supply 12. The assistant operator 37 may carry a wireless and/or wired communicator (i.e., communication device) 39 suitable for communicatively coupling with the first WCC circuitry 28 using wireless or wired communication techniques. For example, the communicator (e.g., welding operator communications system) 39 may be communicatively coupled to the communications circuitry 43 via wired conduits (e.g., USB, RS-232, 10BASE-T, two-wire, and so on) and/or wireless protocols (e.g., Bluetooth, WiFi, WiMax, wireless mesh, ZigBee, and so on), or a combination thereof.

The welding operator 35 may also carry a second communicator 39, or may have the communicator 39 included in a welding helmet 41, for example. As shown, the second communicator 39 carried by the welding operator 35 may be communicatively coupled to the communications circuitry 43 disposed in the wire feeder 14. In use, the welding power supply 12 and the wire feeder 14 each act as duplex communication points or "access points" for the respective communicators 39. The welding cable 36 may then provide for duplex communications by providing a wired conduit between the welding power supply 12 and the wire feeder 14. It is noted that the WCC circuitry 28 may be stand alone circuitry or may be additionally or alternatively included in other welding system 10 components.

In some work environments, such as inside a ship's hull, in a mine, in a shaft, and so on, the welding power supply 12 may be disposed at a relatively long distance from the wire feeder 14. Accordingly, the weld cable 36 may include a length of between 1 and 15 ft., 1 and 50 ft., 1 and 100 ft. or more. In these environments, over-the-air communications between the welding operator 35 and the assistant operator 37 may be impractical because of hull plates and other structures. Accordingly, communications between the welding operator 35 and the assistant operator 37 may be provided via the first and second WCC circuitry 28 communicatively coupled to the weld cable 36. In this manner the welding operator 35 may communicate with the assistant operator 37 even when over-the-air communications are impractical. It is noted that the communications using the weld cable 36 as a wired conduit may occur even during system 10 operations (e.g., welding, cutting, grinding, induction heating, testing, and so on) when the power provided through the weld cable 36 facilitates the system 10 operations. The communications may include voice communications, text communications, and depending on weld cable characteristics, multimedia communications (e.g., audio, video, images, and so forth). Further, the communications may include certain sensor 45 data, as described below.

In some circumstances, it may be useful to monitor certain environmental and/or operator readings related to operator health (e.g. biometric readings). Accordingly, the sensors 45 may include environmental sensors 45, such as temperature sensors, gas composition sensors, light sensors, and the like. The sensors 45 may additionally include biometric sensors 45 disposed on the welding operator 35, such as pulse oximetry sensors, temperature sensors, "fitness" type sensors (e.g., heart rate, activity monitors), and the like. The sensors 45 may include wireless and/or wired sensors communicatively coupled to the second WCC circuitry 28. In this manner, environmental and/or health data related to the welding operator 35 may be communicated.

It is also noted that external systems, such as an external system 49, may be communicatively coupled to the power supply 12 and/or the first WCC circuitry 28 for communications with the welding operator 35. The external system 49 may be disposed geographically distant from the power supply 12 and/or local to the power supply 12. The external system 49 may include a "cloud" based system, a tablet, a cell phone, a workstation, a notebook, a laptop, a wearable computing system, and the like. In use, the external system 49 may interface with the first WCC circuitry 28, and the first WCC circuitry 28 may then act as a duplex communications point to communicate with the second WCC circuitry 28 and with the welding operator 35.

FIG. 2 is a flow diagram of an embodiment of a method 66 for correcting a distortive characteristic of the weld cable 36 in the weld system 10, in accordance with aspects of the present disclosure. Specifically, the distortive characteristic may be a frequency and time dependent amplitude and phase distortion of the weld cable 36. The distortive characteristic may be determined by determining one or more channel equalization filter coefficients. Further, the WCC circuitry 28 may compensate for the distortive characteristic by utilizing the determined channel equalization filter coefficients.

As noted above with respect to FIG. 1, the WCC circuitry 28 of the welding power supply 12 may be configured to characterize the parameters or properties of the weld cable 36 with one or more channel equalization filter coefficients. Specifically, the one or more channel equalization filter coefficients may be values that are representative of various characteristics of the weld cable 36. For example, the channel equalization filter coefficients may be representative of a distortive characteristic of the weld cable 36. In other words, the channel equalization filter coefficients may be representative of frequency and time dependent amplitude and phase distortions of the weld cable 36. In this manner, the systems and methods described herein allow for the characterization of the weld cable 36, and obviate the need for taking actual measurements to characterize the weld cable 36, as further described in detail below. Further, the one or more channel equalization filter coefficients may be utilized to compensate for frequency and time dependent amplitude and phase distortion within the weld cable 36 that may influence the power or data being transmitted. For example, certain embodiments address situations in which the welding voltage provided by the welding power supply 12 would be substantially different than the welding voltage received by the welding torch 16 due to frequency and time dependent amplitude and phase distortion in the weld cable 36 if not mitigated. Accordingly, the WCC circuitry 28 may be configured to determine one or more channel equalization filter coefficients that may be representative of distortion characteristics of the weld cable 36. Further, the WCC circuitry 28 may be configured to utilize the one or more channel equalization filter coefficients that are determined to compensate for any frequency and time dependent amplitude and phase distortion within the weld cable 36, as further described below.

The method 66 begins with the WCC circuitry 28 transmitting modulated tones and unmodulated tones (block 68) from the welding power supply 12 and/or the wire feeder 14. Specifically, the DAC 38 of the WCC circuitry 28 (of either the welding power supply 12 or the wire feeder 14) may be configured to transmit the modulated and unmodulated tones. As noted above, modulated tones may include information related to the welding process or operation, such as information related to an operating parameter (e.g., weld voltage, wire speed, etc.) of the welding system 10 or related to an adjusted operating parameter of the welding system 10. In particular, unmodulated tones (e.g., pilot tones) transmitted by the DAC 38 may not carry any information related to the welding process or operation. Instead, unmodulated tones may be sinusoidal reference signals that have predefined or known characteristics, such as a predefined amplitude, frequency, and/or phase. For example, in certain embodiments, all of the unmodulated tones transmitted may have the same frequency and amplitude. In certain embodiments, the modulated tones transmitted may also have known characteristics that allow the modulated tones to be utilized as the reference tones. Furthermore, in certain embodiments, the unmodulated tones may each be transmitted at a known phase. For example, each of the unmodulated tones transmitted may be equally spaced in tone frequency, such that each succeeding tone increments its phase reference to the first tone by 90 degrees. For example, if a first unmodulated tone is at a reference of 0 degrees of phase, a second unmodulated tone may be at 90 degrees phase, a third unmodulated tone may be at 180 degrees phase, and so forth. It should be noted that the unmodulated tones may be configured at any alternate unmodulated tone configuration, so long as the frequency, amplitude and phase configurations are known and substantially constant. For example, in certain embodiments, the phase of each unmodulated tone need not be equally spaced, so long as the phase is known.

The method 66 further includes the WCC circuitry 28 receiving the transmitted modulated and unmodulated tones at the ADC 40 (block 70). In certain embodiments, the WCC circuitry 28 may transmit the modulated tones and unmodulated tones to the welding torch 16 and may receive the transmitted tones from the welding torch 16. In such situations, the WCC circuitry 28 may be configured to account or compensate for the distortion of the weld cable 36 twice and/or in two directions (e.g., a first distortion from the WCC circuitry 28 to the welding torch 16 and a second distortion from the welding torch 16 to the WCC circuitry 28). In other embodiments, the welding torch 16 may include a DAC 38 that is configured to transmit the modulated and unmodulated tones. In such situations, the WCC circuitry 28 may be configured to account or compensate or the distortion of the weld cable 36 once and/or in one direction. In either situation, the ADC 40 may be configured to receive the modulated and unmodulated tones, and may also be configured to receive the original location from which the tones were transmitted.

The ADC 40 may provide the received tones (e.g., modulated and unmodulated) to the filter function 42 for further processing. Further, in certain embodiments, the method 66 includes applying a digital filter function to the received modulated and unmodulated tones with the filter function 42 (block 72). As noted above, the digital filter function may be utilized to compare the transmitted unmodulated tones with the received unmodulated tones. As noted above, the transmitted unmodulated tones are transmitted with a known amplitude, frequency, and phase. Accordingly, in certain embodiments, the transmitted unmodulated tones may be utilized as reference tones and compared with the received unmodulated tones within the filter function 42 to determine one or more differences, such as differences in phase, amplitude, or frequency. Based on the differences between the transmitted and received unmodulated tones, the filter function 42 may be configured to determine one or more channel equalization filter coefficients. Specifically, the channel equalization filter coefficients may be representative of the distortive characteristics of the weld cable 36, as further described with respect to FIG. 3.

Further, the method 66 includes compensating for the frequency and time dependent amplitude and phase distortion (e.g., distortive characteristic of the weld cable 36) utilizing the channel equalization filter coefficients (block 74). In certain embodiments, the WCC circuitry 28 may be configured to adjust one or more welding parameters based on the one or more determined coefficients and based on the characteristics of the weld cable 36. For example, in certain situations, the WCC circuitry 28 may increase or decrease a welding voltage provided by the welding power supply 12 to the wire feeder 14 and/or the welding torch 16 based on the calculated channel equalization filter coefficients. As a further example, the WCC circuitry 28 may be configured to increase or decrease a wire speed provided by the wire feeder 14 based on the calculated channel equalization filter coefficients. In some embodiments, the WCC circuitry 28 provides this information to the control circuitry 22, so that the control circuitry 22 may make the proper adjustments to the welding parameters and/or provide the information to other components of the welding system 10. In short, the WCC circuitry 28 may be configured to provide to the welding system 10 the determined and/or calculated distortive characteristics and/or coefficients of the weld cable 36. Accordingly, the calculated or determined distortive characteristics and/or coefficients may be provided by the control circuitry 22 as actual feedback to other components of the welding system 10.

In particular, the method 66 may be utilized as a continuous feedback loop 75 that allows for the correction of power and data transmitted via the weld cable 36 in subsequent times based on the information calculated and determined. In this manner, the WCC circuitry 28 may be configured to regulate and correct for any frequency and time dependent amplitude and phase distortion in the weld cable 36 in a dynamic process during the operation of the welding torch 16. Accordingly, more accurate welding operating parameters may be utilized during the welding process. For example, with the continuous feedback loop 75, the WCC circuitry 28 may dynamically adjust the welding voltage provided to the welding torch 16 and workpiece 62 during the welding process.

FIG. 3 is a flow diagram of an embodiment of a method 76 for calculating the one or more channel equalization filter coefficients of FIG. 2, in accordance with aspects of the present disclosure. As noted above, the filter function 42 of the WCC circuitry 28 may be configured to apply a digital filter function to the modulated and unmodulated tones received by the ADC 40 and transmitted by the DAC 38. In particular, the filter function 42 may be configured to calculate or determine one or more channel equalization filter coefficients based on the modulated and unmodulated tones received by the ADC 40, as further described below.

In certain embodiments, the method 76 begins with separating the unmodulated tones from the modulated tones received by the ADC 40 (block 78). For example, in certain embodiments, the ADC 40 may receive 64 tones, of which 48 tones are modulated tones utilized for data transmission and 16 tones are unmodulated tones. Accordingly, the unmodulated tones may be separated from the modulated tones by the filter function 42 for further processing to determine the one or more coefficients.

In certain embodiments, the method further includes compensating for timing and phasing of the unmodulated tones (block 80). For example, in some situations, there may be one or more clocking variations between the DAC 38 and the ADC 40. Accordingly, the filter function 42 may be configured to compensate for the frequency error between the DAC 38 and the ADC 40 with one or more frequency and/or phase control loops. In particular, the ADC 40 may be configured to associate each transmitted tone with a corresponding received tone. For example, 16 unmodulated tones may be transmitted by the DAC 38 with a known amplitude, a known frequency, and at a known phase shift. Accordingly, each of the 16 transmitted unmodulated tones may correspond to each of the 16 received unmodulated tones. In certain embodiments, compensating for frequency and phase may include associating the transmitted tone with its corresponding received tone. In certain embodiments, the method 76 may be configured to compensate and correct for the frequency variations between the DAC 38 and the ADC 40 before separating the modulated tones from the unmodulated tones.

Furthermore, the method 76 may include measuring the characteristics (e.g., phase, amplitude and/or frequency) of the received unmodulated tones. Accordingly, in certain embodiments, the filter function 42 may be configured to measure the actual amplitude, and the actual phase of the received unmodulated tones (block 82). As noted above, the transmitted unmodulated tones may be transmitted with a known frequency, a known amplitude, and a known phase and may thus be utilized as a reference tone. Accordingly, once the actual characteristics of the received unmodulated tones are determined, the method 76 may include comparing the characteristics of the received unmodulated tones with the characteristics of the transmitted (reference) unmodulated tones (block 84). Comparing the received unmodulated tones and the transmitted (reference) unmodulated tones may be done in any suitable manner.

For example, in certain embodiments, the received unmodulated tones are multiplied by the complex conjugate of the original transmitted (reference) unmodulated tones. The expected result of a vector multiplied by its complex conjugate is a vector with an amplitude and no imaginary part. In this case, the expected answer would be "1+j0." The error vector resulting from the multiplication of the complex conjugate of the received unmodulated tones and the original transmitted (reference) tones is utilized to perform an interpolation. The interpolation populates missing members of the set of tones, at each indexed frequency, with a phasor with an interpolated amplitude and an interpolated phase. In certain embodiments, however, the actual result of a vector multiplied by its complex conjugate indicates an amplitude and phase distortion for each tone. For example, the actual answer is a series of vectors, each with amplitude and phase, for each pilot tone frequency. Accordingly, if 16 unmodulated tones received are received for an OFDM symbol length of 64, the actual result of the digital filter function process may be a 3×64 matrix with frequency, amplitude, and phase as column vectors and each of the 64 values assuming a row position. The 16 measured error vectors populate the positions in the 3×64 matrix assigned to the reference tones and the 48 'missing' tones, assigned to the data tones, are populated with interpolated values. The resulting 3×64 matrix is then used as the data to calculate the channel equalization filter and also the inverse of the channel equalization filter. Other reference tone versus data tone configurations, FFT lengths and OFDM symbol configurations are possible.

The filter function 42 may be configured to utilize the differences determined between the received unmodulated tones and the transmitted (reference) unmodulated tones to determine the channel equalization filter coefficients (block 86). As noted above, the channel equalization filter coefficients define a Finite Impulse Response (FIR) or Infinite Impulse Response (IIR) filter with a length that is determined by the number of tones used in the OFDM system, otherwise specified as the symbols in an OFDM frame, excluding any cyclic prefix, and which filter provides an inverse function to the frequency dependent amplitude and phase distortion of the weld cable 36. As further information, the inverse of the channel equalization filter is the analytic description of the two port transfer function of the weld cable as a transmission line. For example, the inverse of the channel equalization filter coefficients may be transformed, using a mathematical algorithm, to describe any characteristic or physical property of the weld cable 36 that may have an effect on the power or data transmitted by the weld cable 36. The transfer function (inverse channel equalization filter) may be representative of a length of the weld cable 36, a resistance, an inductance, and so forth. However, it should be noted that the inverse channel equalization filter (transfer function) is not the characteristic itself, but are merely an abstract representation of the characteristics as defined in a sampled time reference system.

In certain embodiments, the method 76 further includes utilizing the channel equalization filter coefficients determined from the unmodulated tones pre-distort each of the modulated and unmodulated tones that will be transmitted by the DAC 38 in the next iteration of the function (block 88). For example, the unmodulated tones may be multiplied with the modulated tones by the channel equalization (FIR) filter to correct for the frequency and time dependent amplitude and phase distortion of the weld cable 36 (e.g., distortive characteristic of the weld cable 36). Accordingly, in this manner, it may be beneficial to utilize the channel equalization filter coefficients to compensate for frequency and time dependent amplitude and phase distortion in the weld cable system (block 90).

In certain embodiments, the method 76 calculates the channel equalization filter and its inverse function. The inverse function of the channel equalization filter provides the equivalent two port transfer function of the weld cable and can be used as an element in the feedback loop within the welding power supply 12 control system, effectively replacing the voltage sense cable 92.

Figure 4:
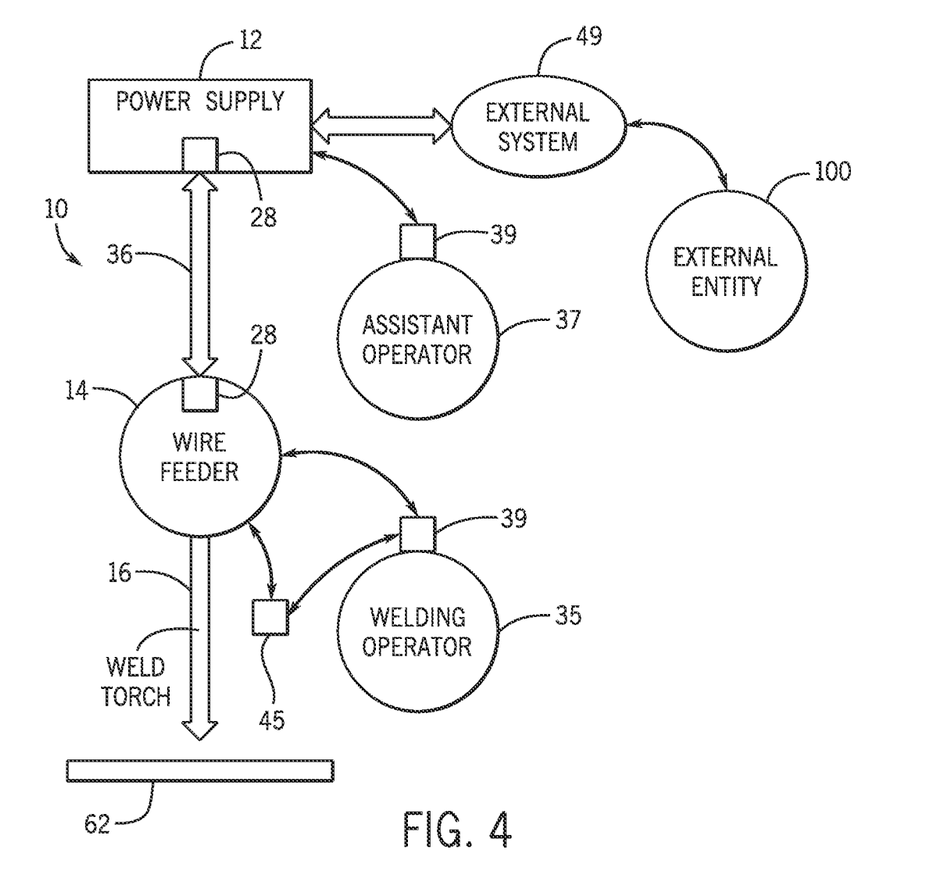
FIG. 4 is a block diagram of an embodiment of the welding system of FIG. 1, illustrating the weld cable, the WCC circuitry; and one or more users communicatively coupled via the WCC circuitry, in accordance with aspects of the present disclosure.

FIG. 4 is a block diagram of an embodiment of the welding system 10 of FIG. 1, illustrating the weld cable 36 as providing for wired communications between the power supply 12 and the wire feeder 14. As mentioned above, the wired communications transmitted via the weld cable 36 may include full and half duplex communications of voice data, text data, and/or multimedia data. In the depicted embodiment, the assistant operator 37 may carry a first communicator 39. The communicator 39 may be coupled via wired and/or wireless conduits to the first WCC circuitry 28 included in the power supply 12. On an opposite end of the weld cable 36, the second WCC circuitry 28 disposed in the wire feeder 28 may be communicatively coupled to a second communicator 39 (e.g., communicator 39 included in the welding helmet 41, in certain embodiments). Sensors 45 may be additionally or alternatively coupled to the second WCC circuitry 28 via wired and/or wireless conduits.

In operations, the WCC circuitry 28 may apply certain tones to characterize the weld cable 36, as described above, to determine the actual power being delivered via the welding torch 16 to the workpiece 62. Additionally or alternatively, the WCC circuitry 28 may communicate data through the weld cable 36 using the same or similar tones used to characterize the weld cable 36. The communications may occur during welding operations, when power is being delivered via the weld cable 36, and/or when power is not being delivered.

Also communicatively coupled to the power supply 12 is the external system 49. The external system 49 may include local access network (LAN)-based systems, wide area network (WAN) based systems, cell communications systems, cloud-based systems, or a combination thereof. The external system 49 may enable an external entity 100, such as a supervisor, a welding instructor, a remote observer, and so on, to communicate with the power supply 12, the assistant operator 37, the wire feeder 14, the welding operator 35, and the sensors 45. Likewise, the assistant operator 37 may communicate with the power supply 12, the wire feeder 14, the welding operator 35, the sensors 45, and the external entity 100. Similarly, the welding operator 35 may communicate with the power supply 12, the wire feeder 28, the assistant operator 37, the sensors 45, and the external entity 100. By providing for techniques suitable for transmitting and receiving data through the weld cable 36, even during use of the weld cable 36, the welding system 10 may improve teamwork and enhance operations of the welding system 10.

Figure 5:
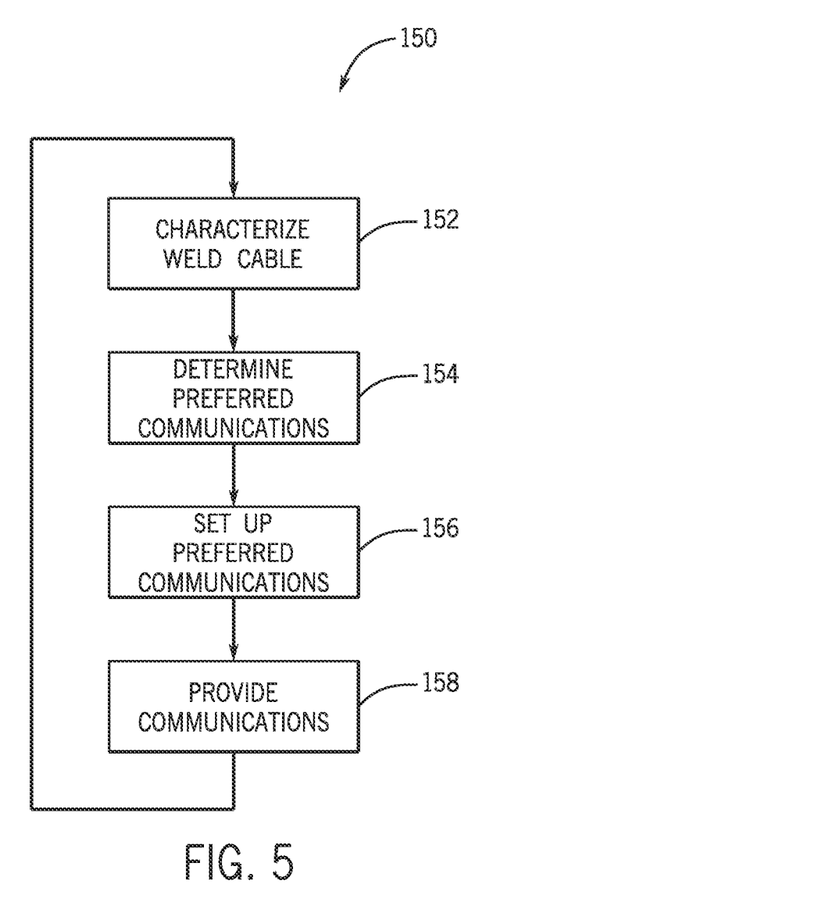
FIG. 5 is a flowchart of a process for communicatively coupling one or more users via the WCC circuitry, in accordance with aspects of the present disclosure.

FIG. 5 is a flowchart of a process 150 suitable for providing communications between various entities, including machine entities and/or human entities. The process 150 may be implemented as computer executable instructions or code stored in the memory 32, 34 and executable via the processor 30. The process may first characterize (block 152) the weld cable 36 via the WCC circuitry 28. As mentioned above, the weld cable 36 may include one or more characteristics (e.g., impedance, cable length, conductor material type, wire gauge) that may cause the weld cable 36 to provide a different power to the workpiece 62 when compared to the power being delivered by the power supply 12. As the weld cable 36 is characterized, the WCC circuitry 28 may automatically determine (i.e., without user intervention) a preferred communications mode (block 154), such as half duplex or full duplex, based on the characterization of the weld cable 36. For example, weld cables 36 having a higher impedance, a longer length, material types that are slightly less conductive, a larger gauge, or a combination thereof, may preferably be used as half duplex conduits, while weld cables 36 with a lower impedance, a shorter length, a higher conductance material, and/or a smaller gauge, may preferably be used as full duplex conduits. The first WCC circuitry 28, the second WCC circuitry 28, or a combination thereof, may be used in the determination of the preferred communications mode (block 154).

In one embodiment, the first WCC circuitry 28 and the second WCC circuitry 28 may interchange tones at half duplex and at full duplex and then determine which communications mode may be preferable based on the quality of the interchanged tones. In another embodiment, a user may determine the preferred mode of communications via a setting that is set by the user via a user interface (e.g., control panel, display, etc.) on the power supply 12, on the communications system 39, on the wire feeder 14, on the welding helmet 41, on the welding torch 16, or a combination thereof. The process 150 may then configure (block 156) the preferred communications, for example, by selecting phase-shift keying, bi-phase modulation, pulse position modulation, or any other modulation scheme. The process 156 may additionally or alternatively configure (block 156) the OFDM scheme, CDMA, other cell-based communication protocols, and/or the IEEE standard P1901.2 based on the determination (block 154). Indeed, the techniques described herein may provide for cell-based communication protocols (e.g., cell phone protocols) but applied to using the weld cable 36 as a conduit, instead of wireless conduits.

The first and/or the second WCC circuitry 28 may then provide communications through the weld cable 36 between one or more entities, including hardware and human entities. The hardware entities may include external systems 49, the power supply 12, the wire feeder 14, the welding torch 16, the communications systems 39, the welding helmet 41, the sensors 45, and/or any component of the welding system 10. The human entities may include the welding operator 35, the assistant operator 37, entities 100 interfacing with the external system 49, entities interfacing with the communication systems 39, or a combination thereof. By providing for communications via the weld cable 36, even during transmission of power via the weld cable 36, the techniques described herein may provide for more flexible and more robust communications in a variety of environments, including environments unsuitable for over-the-air communications. The process 150 may be iterative, and may thus return to block 152.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A welding system, comprising:
a welding power supply configured to provide welding power;
a weld cable coupled to the welding power supply and configured to transmit the welding power;
wherein the welding power supply further comprises a weld cable communications (WCC) circuitry comprising:
a power transmitter to output a plurality of tones;
a receiver; and
a processor coupled to the power transmitter and configured to:
transmit via the power transmitter an unmodulated initial reference tone of the plurality of tones to a wire feeder system or a welding torch through the weld cable together with the welding power, the unmodulated initial reference tone comprising one or more unmodulated tones, the unmodulated initial reference tone having one or more known characteristics; and
receive an unmodulated second reference tone from the wire feeder system or the welding torch via the receiver to provide bidirectional communications via the weld cable while the welding power is provided through the weld cable,
wherein the processor further comprising:
a memory to store one or more templates of reference tones that have known characteristics; and
a digital filter function to determine one or more differences between one or more characteristics of the transmitted unmodulated initial reference tone and the received unmodulated second reference tone,
wherein the processor is further configured to:
determine one or more channel equalization filter coefficients based on the one or more differences; and
compensate for a distortive characteristic of the weld cable based on the one or more channel equalization filter coefficients and the welding power supply is configured to automatically adjust the welding power based on the distortive characterization of the weld cable.

2. The welding system of claim 1, wherein the communications comprise bidirectional audio communications.

3. The welding system of claim 1, wherein the processor is configured to transmit and to receive the plurality of tones to provide communications with the wire feeder system, wherein the wire feeder system is configured to route the welding power from the weld cable to the welding torch.

4. The welding system of claim 3, wherein the wire feeder system is configured to provide communications between the welding power supply and a welding operator communications system.

5. The welding system of claim 1, wherein the one or more characteristics of the unmodulated initial reference tone and the unmodulated second reference tone include one or more predefined amplitudes, frequencies, or phases, and the plurality of tones further comprises one or more modulated tones with one or more known data modulation schemes.

6. The welding system of claim 1, wherein the processor is configured to communicatively couple with a cloud-based system to provide communications to the cloud-based system.

7. The welding system of claim 1, comprising a sensor configured to:
monitor environmental conditions or operator health; and
communicate with the welding power supply, an external system, or a combination thereof, via the weld cable.

8. The welding system of claim 1, comprising a welding helmet, wherein the welding helmet comprises a welding operator communications system, and wherein communications between the welding power supply and the welding operator communications system occurs at least partially over the weld cable.

9. The welding system of claim 1, further comprising a communications system configured to communicate with an external system, the power transmitter configured to transmit data based on information received from the external system via the communications system.

10. The welding system of claim 9, wherein the communications system is configured to communicate wirelessly with the external system.

11. The welding system of claim 9, wherein the receiver is configured to receive information, and the communications system is configured to communicate the information to the external system.

12. The welding system of claim 1, wherein the known characteristics comprise one or more of a predefined amplitude, a predefined frequency or a predefined phase.

13. The welding system of claim 1, wherein the power transmitter comprises a digital to analog converter to transmit the unmodulated initial reference tones as one or more unmodulated tones that do not carry data.

* * * * *